Hemperly & Burns,
Grain Binder.
No. 49,756. Patented Sep. 5, 1865.
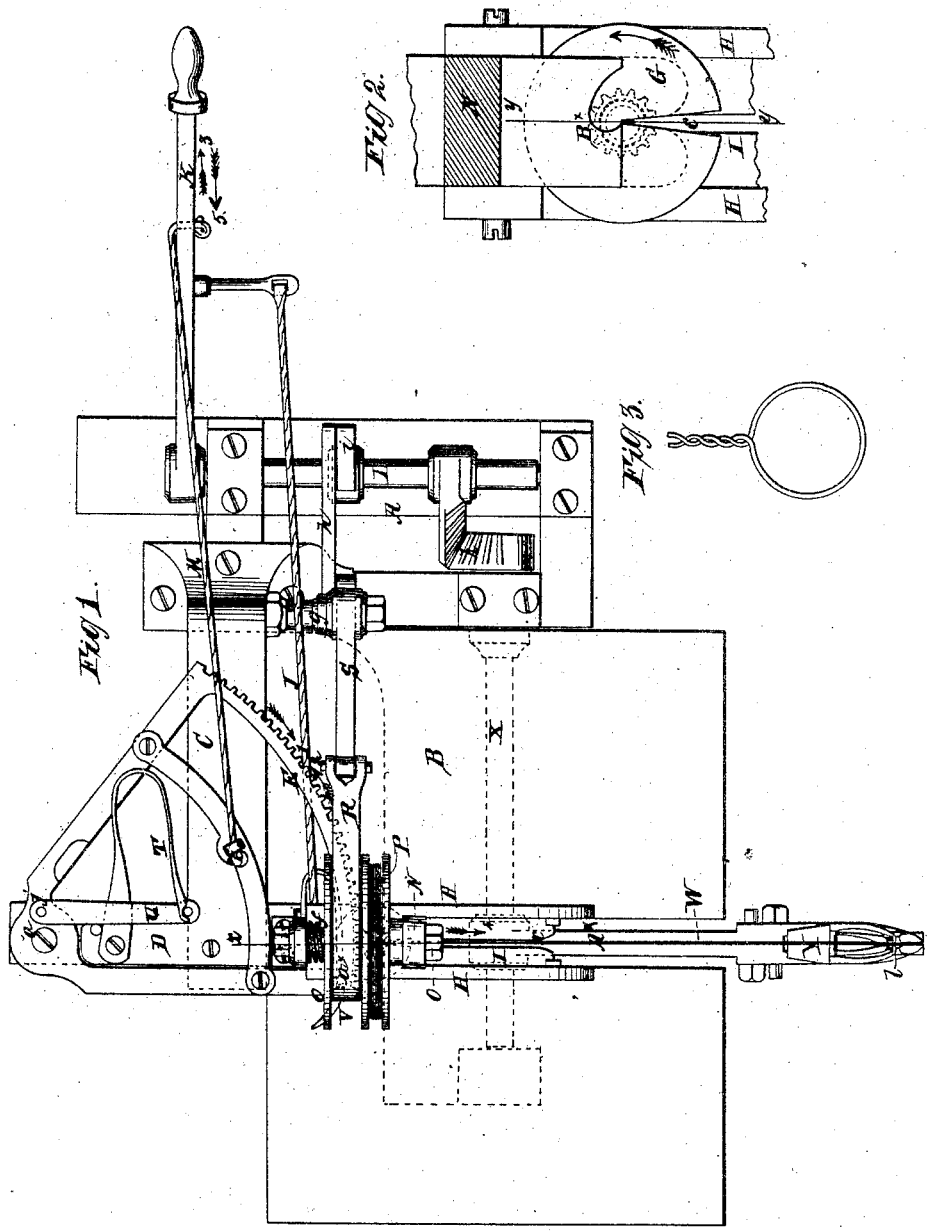

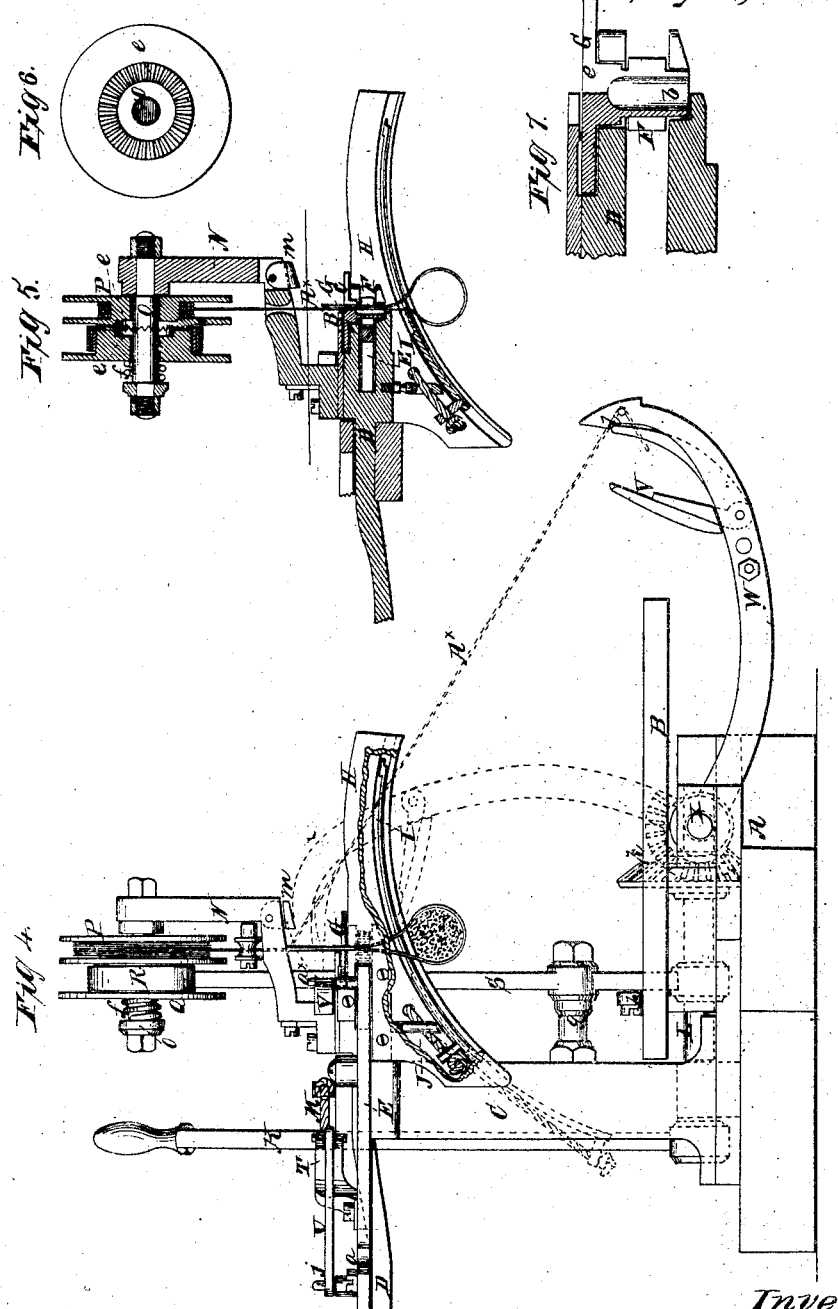

UNITED STATES PATENT OFFICE.

JOHN F. HEMPERLY AND CHARLES BARNS, OF WEST LIBERTY, IOWA.

IMPROVEMENT IN GRAIN-BINDERS.

Specification forming part of Letters Patent No. 49,756, dated September 5, 1865.

*To all whom it may concern:*

Be it known that we, JOHN F. HEMPERLY and CHARLES BARNS, of West Liberty, in the county of Muscatine and State of Iowa, have invented a new and Improved Device for Binding Grain; and we do hereby declare that the following is a full, clear, and exact description thereof, which will enable others skilled in the art to make and use the same, reference being had to the accompanying drawings, forming part of this specification.

This invention relates to a new and improved device for binding grain, the same being designed to be applied to a harvester, and to be operated simultaneously therewith.

In the accompanying drawings, Figure 1, Sheet No. 1, is a plan or top view of our invention; Fig. 2, a detached and enlarged plan or top view of the twisting and cutting device; Fig. 3, a detached view of a wire band twisted and cut from the wire on the spool. Fig. 4, Sheet No. 2, is a side view of the invention, partly in section; Fig. 5, a vertical section of a portion of the same, taken in the line $x\ x$, Fig 1; Fig. 6, a detached side view of the spool on which the binding-wire is wound; and Fig. 7, a vertical section of the same, taken in the line $y\ y$, Fig. 2.

Similar letters of reference indicate corresponding parts.

A represents a framing, on which a horizontal bed or platform, B, is secured; and C is a metallic frame, composed of a bar, a portion of which has an upright, and a portion a horizontal position.

D is an arm which projects at right angles from the upper horizontal part of the frame C, and has a toothed sector, E, secured to it by a pivot-bolt, $a$, said sector gearing into a pinion, F, the axis $b$ of which is tubular, and has its bearings in the arm D. (See Figs. 5 and 7.)

On the top of the axis of the pinion F there is a circular plate, G, which has a V-shaped notch, $c$, made in it, extending from its center to its periphery, as shown in Fig. 2.

H H are two curved plates, between which a slotted slide, I, is fitted, said slide being also of curved form, corresponding with the plates H, and working in grooves $d$, made in the inner surfaces of said plates. This slide I has a cord, J, attached to its rear end, said cord passing through a hole in one of the plates H, and connected to a lever, K, of a shaft, L, the bearings of which are on the framing A. The toothed sector E is also connected by a cord, M, to the lever K, as shown in Fig. 1.

N is a support attached to the arm D, and having a horizontal shaft, O, in its upper end, on which a spool, P, is placed loosely, said spool having the wire A wound upon it from which the bands are formed.

Adjoining the spool P, and on the same shaft O, there is placed loosely a pulley, Q. This pulley and the spool are connected by ratchets $e\ e$, which are kept in contact by a spiral spring, $f$, on the shaft O. (See Fig. 5.) The pulley Q has a strap, R, upon it, which is attached to the upper end of a lever, S, the lower end of the latter, below its fulcrum $g$, being connected by a link, $h$, with an arm, $i$, on shaft L.

By this arrangement it will be seen that when the lever K is moved in one direction the lever S will be moved simultaneously in an opposite direction.

T is a spring, one end of which is secured to the arm D, and the opposite end to an arm, U, which is secured by a pin or bolt, $j$, to the toothed sector E. This spring has a tendency to throw the toothed sector in the direction indicated by arrow 1.

V is a spring-catch attached to the lower part of the support N, and designed for holding the toothed sector E in position at the termination of its movement in the direction of the arrow 2.

W is an arm attached to a shaft, X, underneath the bed or platform B, and which is connected by geared segments $k$ with the shaft L. This arm W has jaws $l$ at its upper end, and has a plate, Y, projecting from it. (Shown clearly in Fig. 4.)

The operation is as follows: By drawing the lever K outward, or in the direction indicated by arrow 3, the arm W will be thrown back or outward from the plates H H, in consequence of the connection of the shafts L X by the geared segments $k$, and the toothed sector E will at the same time be drawn by the cord M in the direction of arrow 2, and the slide I moved forward between the plates H H by the cord J, in the direction indicated by arrow 4, the sector E, when the lever K is drawn fully back, being held by the catch V, which hooks over a pin, $a^x$, on the segment. As the arm W moves back, the wire $A^x$, the end of which is held between the jaws $l$, is drawn back with it, and unwound from the spool P.

The machine is now in a condition to receive the gavel to be bound, which is placed on the bed or platform B and over the wire $A^x$. The lever K is now shoved forward in the direction indicated by arrow 5, and the arm W is moved upward, the pulley Q, in consequence of its connection to the lever S by means of strap R, turning the spool P, and winding up the wire $A^x$ thereon, and drawing the wire snugly around the gavel until the tension or strain is sufficiently great to overcome the connection formed between the spool P and pulley Q by the ratchets $e$, when the pulley slips, the arm W still moving, and when the plate Y comes in contact with slide I, through the slot of which the wire passes, shoving said slide backward between the plates H H, the wire passing into the notch $c$ of the circular plate G, both parts of the wire being now in $c$, and between the jaws $l$, which come in contact with the catch V, and liberate the sector E, which is moved, under the action of spring I, in the direction indicated by arrow 1, the plate G being thereby rotated through the medium of pinion F, which gears into E, and the wire being consequently twisted, and then cut off by a cutter, $B^x$, above plate G.

The wire, previous to being cut off, is caught between the jaws $l$ by a wedge-shaped pendant, $m$, in the support $n$, which spreads the jaws to receive the wire.

Having thus described our invention, we claim as new and desire to secure by Letters Patent—

1. The toothed sector E, in connection with the pinion F, slotted plate G, the arm W, carrying the wire $A^x$, and the knife or cutter $B^x$, all arranged to operate in the manner substantially as and for the purpose set forth.

2. The arrangement of the spool P and pulley Q with the ratchets $e$ $e$, in connection with the band R and lever S, substantially as and for the purpose specified.

3. The slotted slide I, connected with the lever K, and arranged to operate in connection with the arm W, for the purpose set forth.

4. The arrangement of the arm W on shaft X, in combination with the levers K and S, substantially as shown, so that they will move simultaneously by the application of power to lever K, as and for the purpose as described.

5. The spring-catch V and the spring T, arranged with the toothed sector E, in order to hold the same until the twist is to be given the band, and then to move the sector and give the twist, substantially as described.

JOHN F. HEMPERLY.
     CHARLES BARNS.

Witnesses:
 J. W. GIVANS,
 ASA GREGG.